Patented Aug. 16, 1938

2,127,103

UNITED STATES PATENT OFFICE 2,127,103

REACTION PRODUCTS OF A PRIMARY ALCOHOL AND A TERTIARY ARALKYL AMINE SULPHURIC ACID SALT

Herman A. Bruson, Elkins Park, and Otto Stein, Lansdowne, Pa., assignors to Röhm & Haas Company, Philadelphia, Pa.

No Drawing. Application April 13, 1935, Serial No. 16,238

14 Claims. (Cl. 260—563)

This invention relates to a method for making quaternary ammonium compounds and salts thereof, which can be used as wetting, dispersing, emulsifying, spreading, froth-producing or cleansing agents.

It is already known that certain quaternary ammonium compounds are useful for the above purpose. For example, heterocyclic tertiary amines such as pyridine, quinoline, isoquinoline and certain other tertiary amines have been heated with long chain alkyl halides to produce quaternary pyridinium or ammonium halides. It has also been proposed to heat pyridine and its homologues at elevated pressures and temperatures with alkyl sulphuric acid esters or with a mixture of an alcohol and a sulphonating agent capable of forming alkyl sulphuric acids with the alcohol such as sulphuric acid, sulphur trioxide or chlorsulphonic acid. It is also known that tertiary aromatic amines such as dimethylaniline when heated with alcohols and sulphuric acid under pressure to 250–300° C. form quaternary ammonium sulphuric acids and also partly undergo nuclear alkylation. It has also been proposed to employ compounds such as cetylbenzyldiethylammonium chloride or the corresponding acid sulphuric acid salt as an emulsifying agent. (Somerville U. S. Pat. 1,883,042).

Aside from the fact that the quaternary pyridinium and related salts tend to give objectionable odors to bodies with which they may be mixed and that the quaternary ammonium salts of dimethylaniline and its homologues are highly toxic and develop color on standing, the prior processes have required either autoclaves and high temperatures, or else the preparation of the expensive tertiary amines such as cetyldiethylamine (Somerville) which are then treated with benzylchloride or with some other alkyl halide and subsequently heated with sulphuric acid to convert them to the quaternary ammonium sulphuric acid.

We have found however that these quaternary ammonium compounds can be readily prepared in excellent yields by heating neutral, primary alcohols at ordinary atmospheric pressure and at a temperature as low as 80° C., and more easily at 100–110° C., with reacting proportions of a preformed acid sulphuric acid salt of a tertiary aralkylamine, said sulphuric acid salt having the formula

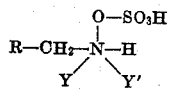

where R is an aromatic or alkylated aromatic hydrocarbon group, and Y and Y' are individually alkyl groups or jointly with the nitrogen atom form a heterocycle. The acid sulphuric acid salt above is first prepared by adding to 1 mol. of the amine 1 mol. of concentrated sulphuric acid.

The condensation between the alcohol and the acid sulphuric acid salt of the tertiary aralkylamine takes place almost quantitatively if the reaction is carried out with higher primary alcohols such as those which boil above about 150° C., in the presence of an inert, volatile organic liquid which is preferably a solvent for the condensation product, and which can carry off in vapor form the water which is liberated in the process as fast as it is formed. This is advantageously accomplished by the use of toluene as the liquid medium at about 110° C. in a vessel fitted with a reflux condenser which is open to the atmosphere and which is attached to an automatic water separator that serves as a trap to collect the condensed water but allows the toluene to run back into the reaction vessel. The reaction is complete when the product becomes completely soluble in water. This usually requires 1 to 7 hours boiling and removal of the water as fast as it is formed allows the reaction to go to completion. The use of a solvent eliminates the necessity of using high pressures and temperatures and hence no autoclave is required. Furthermore the products obtained are substantially odorless and do not affect the odor of cloth, skins or liquids with which they may come in contact. They are furthermore stable to light.

Other solvents such as benzene, xylene or dioxane can be used in place of the toluene. When dioxane is used, it is unnecessary to use a water separator as the dioxane dissolves the water which is formed. Consequently in this case the condensation is carried out by boiling under a reflux condenser at 100° C. until a test sample is completely soluble in water. In general it is best not to exceed a reaction temperature of 150° C. since above this temperature darkening, decomposition or side reactions can set in. A temperature just sufficiently high to split off the water is preferred.

Furthermore the reaction can be carried out without a solvent by simply heating the aralkyl tertiary amine acid sulphate and the alcohol with good stirring under a short air condenser at atmospheric pressure so that the water can escape easily without loss of either of the components by volatilization. This method however is difficult to control and often does not go to completion. It is therefore less satisfactory than the method in which a solvent is used.

When the condensation is complete the solvent is evaporated, or distilled off and recovered. The quaternary ammonium compound is left behind as a colorless thick oil which is readily soluble in water, benzene, or alcohol. Its aqueous solution is acid towards litmus and is capable of precipitating gelatine. It can be used in leather tanning operations or as a detergent, wetting, flotation, spreading or emulsifying agent.

Upon neutralization of the —SO$_3$H group of the above product with sodium hydroxide or potassium hydroxide or with the corresponding alkali metal carbonates or bicarbonates, and evaporating to dryness, the neutral alkali metal salts of the above compounds are obtained as white waxy products resembling spermaceti. These metal salts as well as the corresponding alkyl amine or ammonium salts of the products are likewise soluble in water and can be used in washing, bleaching, bucking, dyeing, and mordanting operations. These salts may also be used in hard water since the alkaline earth metal salts of these acids are fairly soluble.

Among the aralkylamines useful in the form of their acid sulphuric acid salts for the purpose of this invention, may be mentioned the N-benzyl dialkylamines such as N-benzyl-dimethylamine, N-benzyl-diethylamine, N-benzyl-dipropylamine, N-benzyl-dibutylamine, N-benzyl-diamylamine and their homologues; N-benzyl-piperidine, N-benzyl-morpholine, and the analogous tertiary aralkyl amines in which the phenyl group of the benzyl radical is substituted by one or more nuclear alkyl groups or in which the phenyl group is replaced by naphthyl, xenyl, or other aromatic hydrocarbon ring.

The alcohols which are used for the purpose of this invention must be "neutral", i. e. they must be free from basic or acidic groups such as free amino, carboxyl, sulphonic acid groups and the like, which can react with the sulphuric acid or with the tertiary amine in an undesired manner and thus render the process inoperative. The alcohols used must contain a primary alcoholic hydroxyl group, otherwise the reaction does not occur. However secondary or even tertiary hydroxyl groups can also be present in the molecule of the primary alcohol used. Furthermore primary alcohols containing an ether-oxygen atom or a —CONH— group as in stearamidoethanol can be used.

For practical purposes the primary, straight-chain monohydric, aliphatic alcohols such as n-octanol, decanol, lauryl alcohol, myricyl alcohol, cetyl alcohol, oleyl alcohol, and n-octadecanol are the most desirable.

Polyhydric aliphatic alcohols such as 1,10-decamethylene glycol or 1,10-octadecanediol or ether alcohols such as ethylene glycol-mono-lauryl ether C$_{12}$H$_{25}$—O—CH$_2$CH$_2$OH or octyl-phenoxyethanol C$_8$H$_{17}$—C$_6$H$_4$—O—CH$_2$—CH$_2$OH can also be used. Amidols such as stearamidoethanol CH$_3$—(CH$_2$)$_{16}$—CONHCH$_2$OH and its homologues can be used.

The reaction however is not limited to the use of these higher alcohols but can also be carried out with lower alcohols such as ethylene glycol, diethylene-glycol, trimethylene glycol, glycol-mono-ethyl ether, glycol-mono-butyl ether, diethyleneglycol-mono-butyl ether, glycerol, propyl, butyl, or amyl alcohol, alphaethyl hexanol, tetrahydrofurfuryl alcohol, phenoxyethanol, cyclohexyl carbinol and other neutral alcohols of the aliphatic, aromatic, hydroaromatic and heterocyclic series, containing a primary alcoholic hydroxyl group.

The products obtained by the present process do not decompose appreciably under normal washing, scouring, bleaching or dyeing conditions involving acidic, neutral, or alkaline media or in hard water. Those prepared from the higher fatty alcohols containing from 12 to 30 carbon atoms in the —CH$_2$—R' group are excellent detergents.

The tertiary aralkylamines used in the present process are readily obtainable by condensing benzyl-chloride or its homologues or nuclear alkyl derivatives, with secondary amines of the aliphatic or cyclo-aliphatic series in the known manner. These aralkyl tertiary amines have only a faint odor and are particularly reactive in the process set forth herein.

The following examples illustrate this invention:

Example 1

In a glass flask fitted with a stirrer and a reflux condenser attached to an automatic water separator, fitted with a syphon to return condensed solvent to the reaction vessel, there were placed 100 grams toluene and 34 grams N-benzyl-dimethylamine. There was added, while stirring, 25 grams of 96% sulphuric acid. The N-benzyldimethylamine acid sulphate which formed separated as an oily layer. To this mixture 46.5 grams dodecyl alcohol (lauryl alcohol) was then added, and the mixture was heated to boiling while being continually stirred. The temperature of the liquid was about 109° C. During the boiling the water which formed was continuously carried over by the toluene vapor to the automatic water separator which separated the water and allowed the toluene to run back into the reaction vessel. After about one hour of boiling no more water came over. A clear colorless solution was obtained. The toluene was evaporated off under reduced pressure on a steam bath. The residue weighed 98 grams. It was a thick colorless oil, which was readily soluble both in water and in organic solvents.

Upon neutralization of the above compound with aqueous 10% sodium hydroxide solution, the corresponding salt was formed. Its aqueous solution is a good wetting, cleansing and emulsifying agent. Upon evaporation of the water in vacuo, the sodium salt obtained formed a colorless, odorless, waxy mass.

When the free acid is treated with an amine such as ammonia or triethanolamine the amine salt formed is also water-soluble and may be used as a leveling agent in dyeing operations or as a dispersing agent for paste dyestuffs.

Example 2

To a solution of 27 grams of benzyldimethylamine in 100 grams toluene, 20 grams 98% sulfuric acid was added while stirring. After stirring for about 1 hour there was added 50 grams of α,α,γ,γ, tetramethylbutylphenoxy-ethanol (prepared from ethylene oxide and α,α,γ,γ-tetramethylbutylphenol) and the mixture was boiled as described in Example 1, under a reflux condenser connected to a water separator for 3½ hours during which time the mixture became a clear solution. Upon evaporating off the toluene in vacuo at 60–70° C. the acidic product was obtained as a viscous oil which on standing solidified to a colorless crystalline mass. It was readily soluble in water yielding a soapy, foamy, acidic solution. Upon neutralization with caustic soda solution and evaporation to dryness the sodium salt of the above acid was obtained as a cream colored waxy mass which can be used as a spreading or wetting agent for insecticides.

Example 3

1 molecular equivalent p-methyl-benzyldimethyl amine in four times its weight of toluene is converted to its acid sulphate by treatment with 1 mol. of 98% sulphuric acid. One mol. of cetyl alcohol is then added and the mixture is boiled 2-4 hours with good stirring until no more water comes over and a clear solution is obtained. Upon evaporation of the solvent in vacuo the product remains as a viscous mass which dissolves in water to give a foamy, soapy solution. Its sodium and potassium salts are white waxy masses.

Example 4

27 grams benzyldimethylamine in 100 grams toluene was neutralized with 20 grams 98% sulphuric acid; then 57.2 grams of 1,10-octadecanediol dissolved in 50 grams toluene was added and the mixture was boiled with rapid agitation for 4 hours under reflux until no more water came over in the automatic water separator. The free acid can be isolated as a viscous mass by evaporating off the toluene in vacuo. It is preferable however to neutralize the toluene solution with 10% caustic soda solution and by evaporation of the toluene and water, to isolate the product in the form of the sodium salt. The product is a colorless waxy mass readily soluble in water to form a soapy solution.

Example 5

27 grams benzyldimethylamine in 100 grams toluene was stirred for 1-2 hours with 20 grams 98% sulphuric acid. To the suspension of benzyldimethylamine acid sulphate thus obtained, 65.5 grams stearamido-ethanol dissolved in 100 grams toluene was added. The mixture was boiled under reflux connected to an automatic water separator for 7 hours. The clear solution obtained was neutralized with aqueous sodium hydroxide solution, and the toluene and water removed under vacuum. The product obtained was a waxy mass which is readily soluble in water and yields a foamy, soapy solution.

Example 6

27 grams benzyldimethylamine in 100 grams of benzene was treated with 20 grams 98% sulphuric acid. There was then added 14.8 grams n-butanol in 20 grams benzene. The mixture was boiled with good stirring for 7 hours using an anutomatic water separator. The clear colorless solution thus obtained was evaporated to dryness in vacuum. It formed a colorless, odorless oil. Yield was 57.5 grams, i. e. quantitative. The oil was soluble in water, acids, or alkalies as well as in organic solvents. Its sodium salt was a crystalline compound, readily soluble in water.

By using a molecular equivalent of n-octanol, n-decanol, cetyl alcohol, myricyl, ceryl, oleyl, or n-octadecyl alcohol in place of the alcohols shown in the examples the analogous compounds are obtained. These are viscous masses which dissolve in water to give a soapy solution. Their sodium, potassium and other alkali metal salts are water-soluble waxy masses.

The benzyldimethylamine used, can be replaced by a molecularly equivalent quantity of any of its nuclear alkyl derivatives such as methyl-isopropyl-benzyl-dimethylamine

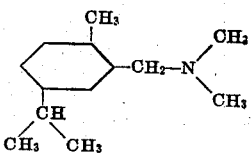

for example, or by the corresponding N-di-ethyl, N-dipropyl, N-dibutyl, N-diamyl, N-piperidine, or N-morpholine analogue.

It is understood herein that in place of the pure higher aliphatic alcohols, the commercial grades and mixtures of such alcohols can be employed such as for example are obtained by the catalytic high-temperature, high-pressure hydrogenation of fatty oil glycerides or of higher fatty acid esters such as the alcohols from the hydrogenation of palm oil, tallow, sperm oil, castor oil, and other fats.

We claim:

1. The method of preparing water-soluble products which comprises heating at atmospheric pressure one molecular equivalent each of a neutral primary alcohol containing more than seven carbon atoms with the acid sulphuric acid salt of benzyldimethylamine in the presence of an inert organic liquid boiling between about 80° C. and about 150° C.

2. The method of preparing water-soluble products which comprises heating at atmospheric pressure one molecular equivalent each of a neutral, primary, aliphatic monohydric alcohol having from 8 to 30 carbon atoms inclusive, with the acid sulphuric acid salt of benzyldimethylamine in the presence of an inert solvent for the product at a temperature sufficiently high to split off water only.

3. The method of preparing a water-soluble product which comprises heating at atmospheric pressure one molecular equivalent each of lauryl alcohol and the acid sulphuric acid salt of benzyldimethylamine at a temperature sufficiently high to split out water only.

4. The method of preparing a water-soluble product which comprises heating at atmospheric pressure one molecular equivalent each of cetyl alcohol and the acid sulphuric acid salt of benzyldimethylamine at a temperature sufficiently high to split out water only.

5. The method of preparing a water-soluble product which comprises heating at atmospheric pressure one molecular equivalent each of n-octadecyl alcohol and the acid sulphuric acid salt of benzyldimethylamine at a temperature sufficiently high to split out water only.

6. The method of preparing water-soluble products which comprises heating equimolecular amounts of a neutral primary alcohol containing at least two carbon atoms and a pre-formed acid sulphuric acid salt of a tertiary amine said tertiary amine being selected from the group consisting of aralkyl N-dialkylamines and N-aralkyl saturated heterocyclic amines.

7. The method of preparing water-soluble products which comprises heating, in the presence of an inert volatile organic solvent at atmospheric pressure and at a temperature sufficiently high to split out water only, equimolecular amounts of a neutral primary alcohol containing at least two carbon atoms and a pre-formed acid sulphuric acid salt of a tertiary amine said tertiary amine being selected from the group consisting of aralkyl N-dialkylamines and N-aralkyl saturated heterocyclic amines.

8. The method of preparing water-soluble products which comprises heating, in the presence of an inert volatile organic solvent at atmospheric pressure and at a temperature sufficiently high to split out water only, equimolecular amounts of a neutral primary alcohol containing more than seven carbon atoms and a preformed acid sulphuric acid salt of a tertiary amine said tertiary amine being selected from the group consisting of aralkyl N-dialkylamines and N-aralkyl saturated heterocyclic amines.

9. The method of preparing water-soluble products which comprises heating, in the presence of an inert volatile organic solvent at atmospheric pressure and at a temperature sufficiently high to split out water only, equimolecular amounts of a neutral primary monohydric aliphatic alcohol containing from eight to eighteen carbon atoms and a pre-formed acid sulphuric acid salt of a tertiary amine said tertiary amine being selected from the group consisting of aralkyl N-dialkylamines and N-aralkyl saturated heterocyclic amines.

10. The product obtained by the process of claim 6.

11. The product obtained by the process of claim 8.

12. The product obtained by the process of claim 2.

13. The process of preparing water-soluble products which comprises heating equimolecular amounts of a neutral primary alcohol containing at least two carbon atoms and a pre-formed acid sulphuric acid salt of an aralkyl N-dialkylamine.

14. The method of preparing water-soluble products which comprises heating, in the presence of an inert volatile organic solvent at atmospheric pressure and at a temperature sufficiently high to split out water only, equimolecular amounts of a neutral primary alcohol containing at least two carbon atoms and a pre-formed acid sulphuric acid salt of an aralkyl N-dialkylamine.

HERMAN A. BRUSON.
OTTO STEIN.

---

Certificate of Correction

Patent No. 2,127,103.  August 16, 1938.

HERMAN A. BRUSON ET AL.

It is hereby certified that error appears in the printed specification of the above numbered patent requiring correction as follows: Page 2, first column, line 63, for the formula "$CH_3-(CH_2)_{16}-CONHCH_2OH$" read $CH_3-(CH_2)_{16}-CONHCH_2CH_2OH$; and that the said Letters Patent should be read with this correction therein that the same may conform to the record of the case in the Patent Office.

Signed and sealed this 22nd day of November, A. D. 1938.

[SEAL]

Henry Van Arsdale,
Acting Commissioner of Patents.